Patented Mar. 3, 1931

1,795,011

UNITED STATES PATENT OFFICE

ROY CROSS, OF KANSAS CITY, MISSOURI, ASSIGNOR TO SILICA PRODUCTS COMPANY, OF KANSAS CITY, MISSOURI, A CORPORATION OF DELAWARE

MOLDING SAND AND PROCESS OF USING

No Drawing. Application filed July 22, 1929. Serial No. 380,264.

This invention relates to the production of a material for use as molding sand in steel, iron, brass and other foundries. It possesses the desirable properties to a much higher degree than usual in molding sand, such as bonding value, permeability, freedom of gas passage, refractoriness, strength, cohesiveness and the like.

In molding sand, the quality and quantity of binding agent present are of great importance. With an ideal agent a core is readily molded wet, stands up well dry, is readily disintegrated after use and the voids between grains are sufficiently open to permit free passage of steam and gases. Clay is the usual bonding agent but it has been found that bentonite in the sand has some advantages.

The present invention relates to molding sand containing bentonite, plastic clay or a mixture of clay and bentonite, as a binder; and it rests on the observation that certain additions greatly improve the quality and utility of these binders. Good molding sands may be made by mixing ordinary sharp sand with a little ordinary clay and adding small proportions of bentonite altered as to its properties by the presence of certain addition agents. Among the most useful of these additions are magnesium oxide (magnesia) and Portland cement. Portland cement can be regarded as consisting of calcium silicate and calcium aluminate in reactive form. Either is useful for the present purposes. In using Portland cement as an addition agent, as a general thing, sufficient cement is added to the bentonite to greatly increase the gelling value in the presence of water. A typical amount to be added is 5 per cent of the bentonite. Magnesium oxide acts in the same way, but ordinarily not so great an amount is required. A typical amount is 1 per cent. Both of these addition agents should of course be finely ground.

These addition agents greatly increase the viscosity of the gel given by bentonite with water. In the following table are shown the proportions of bentonite, with and without addition agent, necessary to obtain a given viscosity with a given amount of water. The material used in obtaining the figures in the first column is a commercial preparation of bentonite containing 2 per cent of ordinary fine Portland cement in admixture. The second column represents the bentonite without the admixture. The viscosities expressed in the third column are those given by the Mac-Michael viscosimeter with No. 30 wire and disc; the viscosity being expressed in angular degrees.

| Treated bentonite | Ordinary bentonite | Viscosity |
|---|---|---|
| Per cent | Per cent | Degree |
| 1.0 | 6.0 | 25 |
| 2.0 | 8.8 | 50 |
| 4.0 | 11.0 | 100 |
| 5.0 | 11.9 | 150 |

From the table, it will be seen that the addition of Portland cement greatly increases the gelling property and this is found to be proportional to the bonding property of bentonite in sand used for foundry purposes. In a general way, it will be noted that the gelling value and hence the bonding value of the treated bentonite is several times that of the untreated; 1 per cent of treated bentonite giving twice the viscosity of a 2 per cent mixture of untreated bentonite, for example. By a treatment with calcium silicate, with magnesium oxide or with other improver of this sort, the bonding value of bentonite in foundry sand is greatly enhanced.

In a typical embodiment of the present invention making an excellent molding sand, 90 per cent of good unbonded sand is mixed with 7.5 per cent of fire clay and 2.5 per cent of the treated bentonite referred to. However the proportions used vary with the particular work to be done by the molding sand and the exact use to which the sand is to be put. In the case of heavy castings, it is ordinarily desirable to use a greater amount of the treated bentonite. In the case of light castings, the amount can be decreased. Likewise, where increased porosity is desired, a larger amount of the bentonite preparation is used. In many cases, it is also desirable to add a small amount of organic matter to the mix. Often this is already contained in the clay used. If organic matter is added it may be in the nature of ordinary humus, or in the nature of finely pulverized bituminous coal, preferably smithing coal, grahamite, gilsonite, drying oils, resins or even rubber latex. Latex is particularly valuable in increasing the strength of the bond without decreasing the permeability of a core. A combination of latex and treated bentonite is particularly effective in giving smooth castings. Instead of latex, sludge oil, obtainable from oil refineries, may be used. It has similar properties for the present purposes, giving a resinous-like material that bonds fairly well.

The reason for the peculiar action of the cement on the bentonite which gives the improved properties noted, is not known; nor is it known whether chemical action occurs. A complete analysis of the mixture above referred to, consisting of commercial bentonite with 2 per cent of added Portland cement, is as follows:

|  | Per cent |
|---|---|
| Loss on ignition | 6.0 |
| Silica ($SiO_2$) | 58.2 |
| Alumina ($Al_2O_3$) | 21.9 |
| Iron oxide ($Fe_2O_3$) | 3.8 |
| Lime (CaO) | 5.9 |
| Magnesia (MgO) | 2.4 |
| Sulphur ($SO_3$) | 0.9 |
| Chlorides (Cl) | 0.2 |
| Alkalies ($Na_2O$) ($K_2O$) | 0.7 |
|  | 100.0 |

A preparation of different analysis but having even more active properties is obtained by mixing bentonite with 1 per cent or so of commercial magnesia. Various active forms of calcium aluminate and of calcium silicate may be used in lieu of either Portland cement or magnesia. These materials may be obtained in commercial zeolites used for water softening and other purposes. It is to be noted that the cement, the magnesium oxide, the calcium aluminate and the calcium silicate are all bodies of alkaline reaction and containing an alkaline earth.

Molding sands made according to this invention, that is by mixing sand, clay and treated bentonite, upon baking and molding, furnish cores of unusually desirable properties.

For the purpose of this specification bentonite may be defined as a hydrated silicate of alumina which, when mixed with 200 per cent or more of water, will form a gelatinous mixture, or a mixture having a viscosity on a MacMichael viscosimeter (using No. 30 wire and disc) of 25 expressed in angular degrees. Some varieties of blast furnace slag are useful as additions to bentonite and to plastic clay. Calcium silicate made from a water soluble calcium salt, such as calcium chlorid and sodium silicate (waterglass) is a particularly good addition agent for bentonite. Slag, cement, calcium, silicate, etc. may be used in improving low grade bentonites; or in giving plastic clays the bentonite properties.

What I claim is:—

1. A molding compound comprising finely divided inert material and bentonite treated to heighten its gelling power with an alkaline substance of the nature of magnesium oxide.

2. A dry molding compound including unbonded sand, and bentonite containing an inorganic modifying agent of alkaline properties, the said modifying agent producing an increase in the gelling power of the said bentonite.

3. A molding compound including unbonded sand, clay and bentonite containing a small proportion of added Portland cement.

4. A molding compound comprising the following substances in approximately the following proportions: 90 per cent sand, 7.5 per cent clay and 2.5 per cent bentonite containing an addition agent enhancing its gel forming properties.

5. In the manufacture of molds for foundry purposes, the process which comprises treating bentonite with an inorganic modifying agent to enhance its gelling powers, mixing the treated bentonite with sand, clay and water, shaping, drying and baking.

6. The composition of claim 1 with an addition of organic matter.

7. A molding compound comprising unbonded sand, clay, bentonite and organic matter, the said bentonite being treated with an alkaline substance of the nature of magnesium oxide.

8. A core binder comprising bentonite modified to increase its gelling power by the addition of a small amount of alkaline reacting material selected from a group comprising magnesium oxide, calcium aluminate, calcium silicate, Portland cement and blast furnace slag.

In testimony whereof, I have hereunto affixed my signature.

ROY CROSS.